UNITED STATES PATENT OFFICE 2,567,257

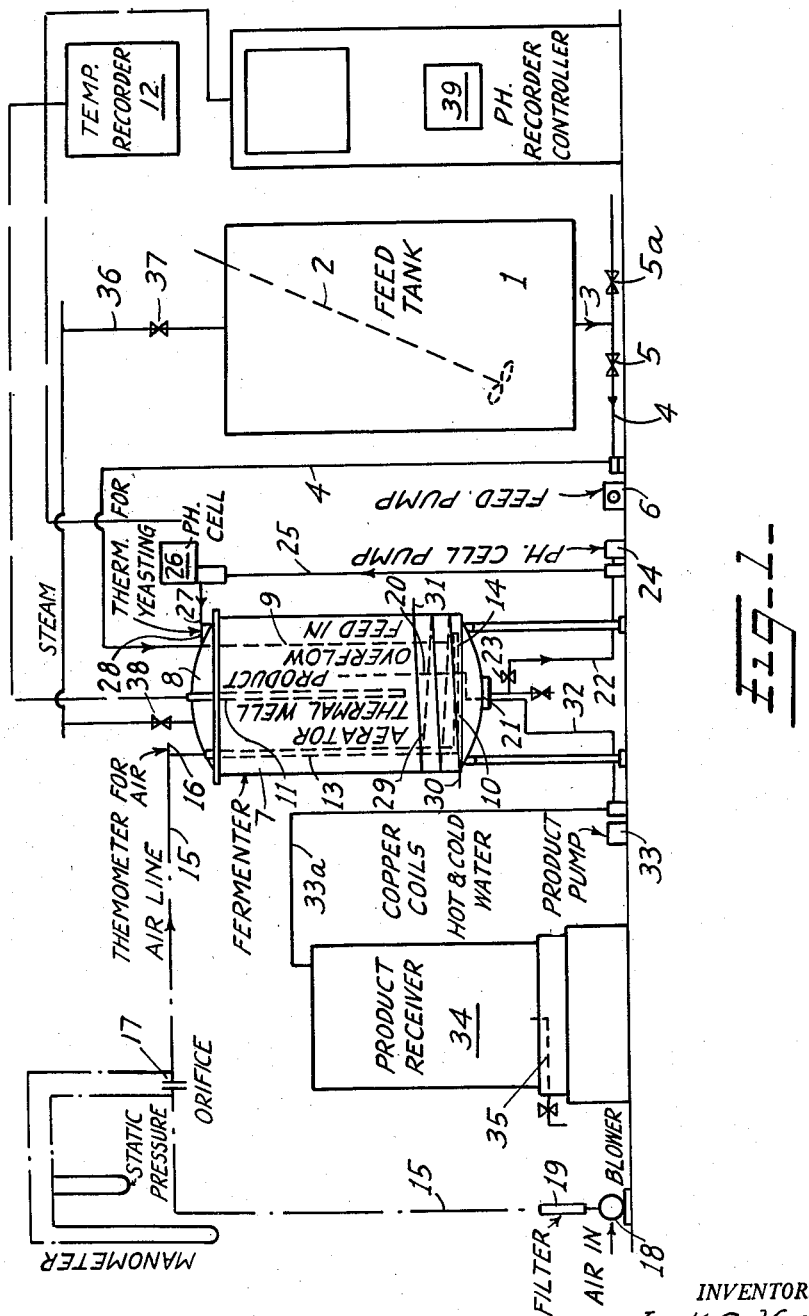

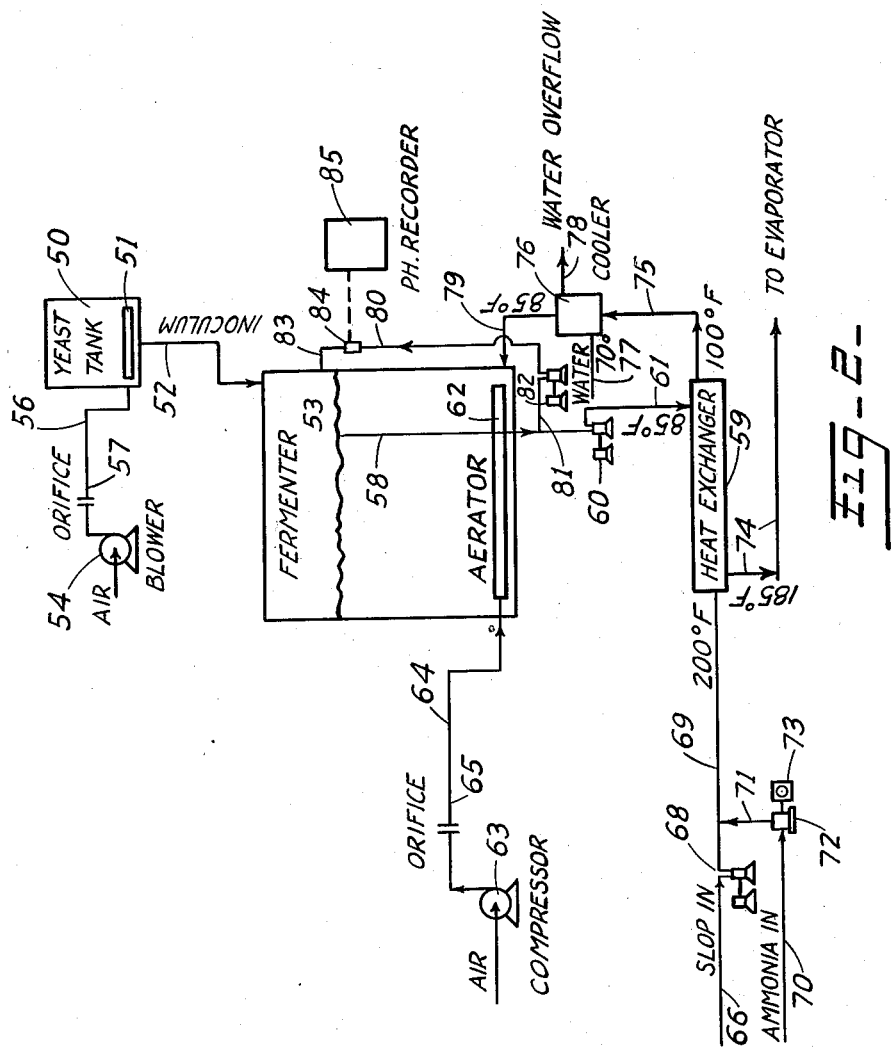

CONTINUOUS PROCESS FOR ENHANCING THE FEED VALUE OF DISTILLERS' SLOP

Jack G. Voss, Silverton, Ohio, assignor to National Distillers Products Corporation, a corporation of Virginia Application April 26, 1949, Serial No. 89,642

17 Claims. (Cl. 99—5)

This invention relates to new and useful improvements in continuous process for enhancing the feed value of distillers' slop.

In the manufacture of distilled liquors and alcohol by the fermentation of cereals, such as wheat, corn, oats, barley, etc., or mixtures of the same, the cereal is mashed and then fermented and finally distilled. The remnants in the still are conveniently termed "distillers' slop" and contain soluble materials in solution and insoluble materials in suspension. The slops are usually separated from at least the coarser, suspended materials, by filtration, screening, centrifuging or other conventional means. The resulting slop contains the normally soluble solids in solution, and usually some additional solids remain in suspension, and is conventionally termed "thin slop."

The thin slops are usually worked up for the recovery of the solid materials therein, which usually includes their concentration by evaporation to a product of lesser bulk, commonly termed "evaporator syrup," and the drying of the latter by suitable conventional equipment, such as drying drums and the like. Depending, among other things, upon the particular mash bill and/or the particular conditions of mashing, fermentation and distillation and/or concentration, if any, the slops may contain after screening up to 50% by weight of solids. Thin slops usually contain about 2–8% of solids, while evaporator syrup does not normally contain in excess of about 30% of solids.

In ordinary sugar to alcohol fermentation of distillers' mashes, the conventional distillers' type yeast, including brewers' yeast, *Saccharomyces cerevisiae* or the like yeast, utilizes the normally fermentable sugars which are part of the mash medium and become available by conversion of the starchy material therein. The successful propagation of the ordinary distillers' type yeast is to a large extent dependent upon these sugars fermentable by the yeast. There are, however, certain pentose and hexose sugars or secondary combinations thereof which are not normally fermentable by the ordinary distillers' type yeasts. These specific pentose and hexose sugars present at least in part in secondary combinations (normally non-fermentable by ordinary distillers' type yeasts in the fermentation of distillers' mashes), appear in the distillers' slops and constitute a relatively large percentage of the normally solid "solubles" in the slops.

As set forth in the co-pending application of Ellis C. Pattee, filed simultaneously herewith, *Torulopsis utilis* yeast, and preferably the variety *thermophila*, can be grown in batch operations under certain conditions of aerobic fermentation and $NH_3$ addition to make use of these specific pentose and hexoses as a source of energy for the propagation of the yeast, and to synthesize appreciable amounts of new protein material, vitamins and various growth factors and at the same time producing these materials in such balanced amounts and proportions that they are essentially contained in the ultimate product in amounts in excess of minimum chick growth requirements.

I have discovered, however, that I can so adjust the operating conditions of the basic process set forth in said co-pending application that the same may be carried out as a substantially continuous procedure, which surprisingly not only presents the advantages normally inherent in continuous operations but actually permits on an equivalent time basis the satisfactory treatment of slops with *Torulopsis utilis* at a rate per volume of slop treated of from about 2–6 times that obtainable under optimum conditions by batch treatment. Even on an equivalent "new protein" basis, it is possible to treat with my new continuous procedure about 3 times the volume of slop per time unit that can be processed by the batch method under optimum conditions.

One object of the instant invention comprises, among others, the substantially continuous treatment of distillers' slops utilizing the above-referred-to normally non-fermented pentoses and hexoses (present at least in part in their secondary combinations) to thereby obtain slop materials of improved feed value.

Another object of the invention comprises the processing of distillers' slops in substantially continuous operations under conditions permitting a feed value enhancing treatment of relatively large volumes of slop per time unit.

The treatment in accordance with the invention broadly comprises the continuous fermentation of *Torulopsis utilis* inoculated distillers' slop containing not appreciably in excess of about 10% and preferably from about 3–6% of normally solid material by weight of the slop, at a temperature between 75 and 115° F. and preferably between 80 and 95° F. within a pH range of from 4–8 and preferably from 4.5–6.5 in the presence of ammonia of not less than 1% by weight of the normally solid materials in the slop and preferably not in excess of the amount necessary to maintain the pH within the desired range which should normally not exceed about 9% $NH_3$ (by weight of solids) with an average time of residence of the materials in the fermenter of from 2–12 hours, and preferably from 3–7 hours, under conditions of aeration and preferably at the rate of 1–8 volumes of air per minute per volume of liquid in the fermenter.

Within the preferred embodiment of the invention, the ammonia is preferably continuously added in the form of an aqueous solution to the slop, with the ammonia concentration within the slop being automatically adjusted directly responsive to the pH of the fermenting materials to maintain the pH substantially constant at all times.

The invention will be more fully understood and further objects thereof will appear from the following description read in conjunction with the drawings in which:

Fig. 1 represents a diagrammatic representation of structural arrangements for carrying out the treatment in accordance with the invention; and Fig. 2 is a diagrammatic representation of structural arrangements for slop treatment in accordance with a preferred embodiment of the invention.

Referring to Fig. 1, a feed tank 1, preferably provided with a stirrer 2, carries the discharge 3, connected to feed pipe 4 suitably valved at 5 and 5a. Feed pump 6 is cut into the feed conduit 4. The fermenter 7 is provided with the closure 8, securing feed-in line 9 extending to adjacent the bottom 10 of fermenter 7. A thermal well 11, connected to temperature recorder 12, is arranged within fermenter 7 and supported by top 8. An aerator, composed of tube 13 and perforated coil 14, adjacent the bottom 10, is provided within the fermenter 7. Airline 15 is connected to aerator tube 13 and carries the control thermometer 16. An orifice and static pressure manometer arrangement 17 is cut into the airline 15 as an airflow indicator. Air blower 18 is connected to airline 15 by way of the air filter 19. Product overflow 20 is arranged inside fermenter 7, being suitably supported by the bottom 10 thereof and leading into manifold 21. Conduit 22 valved at 23 is connected to the pH cell pump 24. pH cell feed line 25 leads to pH cell 26 which is connected to the return conduit 27, provided with thermometer 28, and passing through top 8 of fermenter 7.

External copper coils 29 provide heater arrangement for the lower portion of fermenter 7 with the entrance for thermostatically regulated (not shown) hot and cold water mixture at 30 and its exit at 31.

Product pump 33 is cut into conduit 32 connected at one end to the manifold 21 and leading into the product receiver 34 provided with the valved discharge outlet 35. Steam connection 36 valved at 37 and 38 leads from the top of feed tank 1 to the top 8 of fermenter 7. pH recorder and controller 39 is electrically connected to the pH cell 26.

In the practical application of the invention, the feed tank 1 is charged with a suitable slop and the requisite amount of ammonia is mixed in, utilizing the stirrer 2. The feed pump 6 is then started to pump the slop ammonia mixture into the fermenter 7 by way of the feed conduits 3 and 4. Just enough material is pumped into the fermenter to bring the liquid level therein to about or just below the level defined by the overflow conduit 20. A mixture of hot and cold water is passed through the copper coils 29, the mixture being thermostatically controlled and preferably responsive to temperature recorder 12 (not shown) in the conventional manner to maintain the liquid within fermenter 7 at a substantially uniform temperature between about 83 and 87° F. The fermenter contents are inoculated with from 1-5% of yeast inoculum per volume of slop in the fermenter. This inoculum may be, for example, advantageously prepared as stated below. Blower 18 is turned on, passing air through filter 19, conduit 15, air-flow measuring device 17, into fermenter 7 by way of conduit 13 and thereto connected perforated coil or porous member 14, and preferably at a rate of about 1-4 cu. ft. of air per minute per cu. ft. of liquid in the fermenter. 1 H cell pump 24 may be used, if desired, at this point to continuously pass fermenter liquid through conduits 22, 25 and 27, and the pH cell 26. The propagating conditions are continued until the yeast count has substantially reached a maximum, which, depending on conditions and materials, may require from 10-24 hours. The fermenter is now ready for continuous operations.

Feed pump 6 is turned on and adjusted to feed slop-ammonia mixture into the yeasted liquid in the fermenter 7 at an hourly rate of about 10-40% by volume of the liquid in the fermenter. This establishes an average residence of materials within the fermenter of about 2.75 to about 9 hours. The material in the fermenter 7 is continuously agitated by the many fine air bubbles propelled from coil or porous member 14, the air issuing therefrom at a rate of flow of about 1-8 and preferably 3-5 volumes of air per minute per volume of liquid in the fermenter. A portion of the liquid in the fermenter is continuously circulated by way of the pH cell pump 24 and conduits 22, 25, and 27 through the pH cell 26, being for instance a conventional Pyrex flow chamber and an electrode assembly of known type comprising for example a glass electrode, a calomel reference electrode, and a temperature compensator (not shown), the assembly being hooked up in the usual manner to a pH recorder, such as an "L. & N. Micromax" pH recorder. The yeasted liquid constantly overflowing into conduit 20 discharges by way of conduit 32 and is transferred by way of pump 33 and conduit 33a into the product receiver 34 whence it may be continuously or periodically withdrawn by way of the conduit 35. If desired, the conduit 35 may be directly connected to suitable evaporator and drying equipment of the conventional type and arrangement (not shown).

For efficient operation of the above described procedure, it is of advantage to add additional ammonia whenever the pH drops to below the desired lower limit. This may be accomplished by adding further amounts of ammonia directly to the tank or into the feed line from feed tank 1. Alternatively, such ammonia may be added by way of the pH cell recycling circuit.

Within the preferred embodiment of my invention, however, and for best results, a solenoid valve may be connected to a source of ammonium supply. Such valve may thus be inserted in the drain line of a tank containing aqueous ammonium hydroxide solution, as is, for instance, shown in the representation of Fig. 2, the valve being operated in conventional manner by an ordinary make and break contact on the pH recorder (not shown).

The temperature of the liquid within the fermenter is preferably measured by suitable means, such as a thermohm placed in the thermal well 11 and connected in the usual manner to a conventional temperature recorder. It is desirable to also include a thermometer in the air line near its inlet to the fermenter, such as is indicated at 16. This is important, as under certain climatic conditions, particularly in summer, the air introduced into the fermenter may be of a temperature above the range required for fermentation within the fermenter 7, in which case it is desirable to first cool the air by any conventional means. By way of further temperature control, it is desirable to include a thermometer in the pH recirculation line for direct contact measuring of the fermenting liquid such as is indicated at 20.

Referring to Fig. 2, a yeast tank 50 is provided with aerator 51 of porous material, such as a block or plate member of carbon, silicious or other ceramic material. Discharge 52 leads from tank 50 into the fermenter 53. Aerator 51 is connected to air blower 54 by way of the air conduit 56 carrying flow measuring arrangement 57. Overflow 58 is connected to the outside jacket of the conventional type heat exchanger 59 by way of pump 60 and conduit 61. Aerator 62, provided at the bottom of fermenter 53 and comprising either a perforated coil or an air diffusing member of porous carbon, silicious or other like material of a substantially capillarily porous nature, is connected to compressor 63 by way of air conduit 64 and the flow measuring arrangement 65. The interior of heat exchanger 59 is connected to slop feed line 66 by way of pump 68 and conduit 69. Ammonia feed line 70 is cut into conduit 69 by way of feed conduit 71, and valve 72 controlled by solenoid 73. Discharge conduit 74 is connected with the outer jacket of heat exchanger 59 at the end removed from the entrance of conduit 61. Conduit 75 connects the interior of heat exchanger 59 with the interior of cooler 76 provided for its outer cooling jacket with water inlet conduit 77 and overflow conduit 78. Feed conduit 79 connects the interior of cooler 76 to the interior of fermenter 53, entering adjacent the bottom thereof. Conduit 80 is connected to overflow conduit 58 by way of branch conduit 81 and pump 82. Conduit 80 is connected to the top of fermenter 53 by way of return conduit 83 and pH cell 84 connected to pH recorder 85.

In the practice of the preferred embodiment of my invention as may be exemplified by reference to Fig. 2, *Torulopsis utilis* inoculum is prepared and stored in tank 50 in the manner herein described to be available to charge fermenter 53 with an initial charge of yeasted materials without the necessity of first having to prepare a batch of such material in the fermenter itself before being able to proceed with continuous operations. It is in this manner possible to prepare a new inoculum charge in tank 50 while the continuous process is proceeding in fermenter 53 so that the charge is available at all times for the next following operation once it becomes necessary to interrupt continuous operations, such as for periodically required cleaning or sterilizing purposes.

After the inoculum is discharged into fermenter 53 and the same is filled to about the overflow level defined by the upper end of overflow conduit 58, air is forced through aerator 62 composed of a perforated coil but preferably of a porous air diffusion material, assuring a widely distributed evolution of fine air bubbles. In that case, depending upon the relative porosity of the aerator used, it may be necessary to supply the air thereto under relative pressure, and it may then be desirable to use an air compressor such as is indicated at 63. On the other hand, an ordinary air blower, such as is indicated at 54, ordinarily suffices for the normally lesser requirements of batch operations in yeast tank 50, though a suitable compressor may be used also for the aerator of this tank as may be dictated by particular requirements or conditions. Airflow is measured by flow measuring device 65 and may be suitably controlled either manually or automatically in response to the measuring device.

Slop, preferably as it is directly obtained from the still after screening and while still hot, is fed by way of the pump 68 and conduit 69 into the interior of the heat exchanger 59. The slop passing through conduit 69 is mixed with the required amount of ammonia as called for by the pH recorder introducing the ammonia by way of the conduit 71 into feed line 69. If desired, the slop may be premixed in a suitable tank. Yeasted material overflowing from fermenter 53 and discharging through overflow conduit 58 is passed by way of pump 60 and conduit 77 into the outside jacket of the heat exchanger 59. The average temperature within the fermenter is suitably maintained constant as illustrated in connection with the description of Fig. 1, and the overflowing yeasted product arrives at the heat exchanger having an average temperature of about 85° F. The slop, plus such amounts of ammonia as are supplied by way of the conduit 71, arrives at the heat exchanger with a temperature of about 200° F. Since the higher temperature slop passes through the interior of heat exchanger 59 and the lower temperature yeasted overflow passes in substantially countercurrent fashion through the jacket or exterior of the heat exchanger 59, a heat exchange between the two liquids is effected. The effective heat exchanging surfaces of the heat exchanger are so dimensioned that the slop-ammonia mixture passes out of the interior of the heat exchanger 59 into conduit 75 at a temperature of about 100° F. The yeasted overflow, on the other hand, has become heated and leaves the jacket of the heat exchanger 59 to enter the conduit 74 at a temperature of about 185° F. In this manner, a heat gain of about 100° F. is achieved, which constitutes a considerable saving when passing the yeasted material through the conduit 74 directly to an evaporator of, for instance, the usual vacuum type in which it may be substantially concentrated to evaporator syrup form without the further addition of heat, or, with at least comparatively little additional heat, to yield a product ready for the drum dryers.

The cooled slop-ammonia mixture passes through conduit 75 into the cooler 76 whence it emerges at the desired temperature for fermentation of about 85 F. being fed through conduit 79 into the bottom of the fermenter 53. Pump 68 is arranged to feed slop into the bottom of the fermenter 53 at a rate of about 1–8 volumes of air per minute per volume of liquid in the fermenter.

Part of the overflow product is continuously cycled back through branch connection 81 by way of pump 82 through conduits 80 and 83 into the top of the fermenter 53 passing through the chamber of, for instance, a glass electrode and calomel reference electrode arrangement in pH cell 84. The pH of the liquid is thus constantly checked and recorded in the usual manner on the pH recorder 85 which is provided with a conventional make and break contact actuated by the indicator arm of the recorder (not shown). The make and break contact arrangement is connected in turn to the solenoid 73 controlling pump 72. When then the pH moves below a predetermined desired value, the solenoid 73 is actuated, operating valve 72 thereby admitting an additional amount of ammonia into the feed line and continuing this operation until the pH has been again brought within the desired range. In this manner, automatic and continuous relatively close pH control is effectuated.

The slop useful in accordance with the invention may be any slop derived as still residue (after removal of coarse particles) from any conventional fermented distillers' mash. Ordinary thin slops may be usually used as such. Alternatively, evaporator syrup, diluted to the required solids content, may be used. The upper limit of solid materials has proven critical in that effective propagation of the *Torulopsis utilis* will not proceed in a slop containing normally solid materials appreciably in excess of about 10%. The upper amount of about 10% of solid materials in the slop has proven critical in that effective propagation of the *Torulopsis utilis* will not proceed in a slop containing normally solid material appreciably in excess of that amount.

In order to obtain a satisfactory actively growing yeast culture for inoculation of slops or the preparation of an initial batch required for continuous operations in accordance with the invention, it is desirable to appropriately acclimatize the yeast culture and prepare a suitable inoculum therefrom. This may be, for instance, accomplished by using as the nutrient a slop-ammonia mixture having a solids content of the slop of about 3-6% and preferably approximating in composition and type that of the slop for which the inoculant is to be ultimately used. The ammonia content should be from 2-3% by weight of the solids in the slop, and should possess an adjusted pH of between 5.5 and 6. A hundred gram portion of this slop-ammonia medium is then added to a 50 x 400 millimeter test tube which is then plugged with cotton and provided with an aerator having an air supply tube and consisting of a fine "aloxite" sphere of about 2.54 cm. in diameter. The entire assembly of medium, aerator and connecting tube is sterilized by autoclaving for 30 minutes at 15 pounds pressure.

Cells of yeast growth of *Torulopsis utilis* var. *thermophila* on wort agar are transferred aseptically to the sterile slop medium, whereupon the tube is supported in a constant temperature water bath maintained at about 85° F. and the aerator connecting tube attached to a compressed air line. A calibrated flowmeter is cut into the air line and air is passed into the culture at a rate of about 4 cu. ft. per minute per cu. ft. of liquid. After 24 hours, 1 ml. portion of this yeast culture is transferred to a fresh tube of sterile slop-ammonia medium of the aforementioned composition and pH, and again aerated for 24 hours at 85° F. under the same conditions. The procedure is once more repeated to give a third growth period of 24 hours in a third proportion of sterile slop-ammonia medium. The entire yeasted medium from the third transfer is then used to inoculate a sterile 6 kg. portion of the same slop-ammonia medium. This culture is then aerated through twelve 3.45 cm. diameter "aloxite" spheres at a rate of 24 liters of air per minute, a small amount of corn oil being added to reduce excessive foaming. Aeration is continued for about 16 hours while the vessel is supported in a water bath maintained at 85° F. This yeasted medium is then ready to serve as acclimatized inoculant for the treatment of slops in accordance with the invention.

The inoculant may be used for the fermentation of a batch of slop-ammonia mixture in the fermenter to serve thereafter as a starting batch for continuous operations. Alternatively, it may serve the inoculation of a slop-ammonia mixture, in, for instance, the preliminary yeast tank, as illustrated in Fig. 2, to prepare a batch of yeasted material ready for use thereafter as a starting material. It is possible to avoid the preparation of new, freshly prepared batches of yeasted material to serve as the starting batch and thus eliminate the yeasting tank by saving in each case the fermenter contents of a run to thereafter use the same for a new run as the starting batch.

The following examples are furnished by way of illustration but not of limitation.

EXAMPLE I

A thin slop containing about 3.05% solids (by weight of slop) was used. This slop was derived from the still residues of a conventional fermented scratch corn spirits mash bill. About 33.4 gallons of slop were placed in the fermenter and mixed with about 1.42 ml. of 28% aqueous ammonia solution per pound of slop. This was inoculated with about 5% of inoculant (by volume of slop) prepared in the manner above set forth. The fermenter was kept at a constant temperature between 83 and 87° F. and air was introduced into the liquid in the fermenter of, for instance, the type illustrated in Fig. 1 at the rate of about 4.1 cu. ft. per minute per cu. ft. of liquid in the slop. The treatment was continued for about 20 hours.

Thereafter the continuous process was commenced using an arrangement exemplified by Fig. 1. The same slop-ammonia mixture as was used to prepare the initial batch was fed into the fermenter at a rate of about 5 gallons per hour while continuing aeration at the rate of about 3.9 cu. ft. per minute per cu. ft. of liquid in the fermenter. The make and break contact at the pH recorder and controller was set to yield in the fermenter a substantially constant pH of about 5.7. The total amount of ammonia passed into the fermenter was about 2.5% by weight of the solids in the slop admixed with the ammonia. The total time of residence of the material in the fermenter was about 6.68 hours. It took about 10 hours for the yeast count to reach equilibrium and the continuously discharging yeasted product had an average yeast count of 24 billion per gram solids and a new protein content of about 7.4% by weight of the solids. The temperature was maintained throughout at between 83 and 87° F. The capacity of the fermenter was about 75 gallons, with the overflow so arranged that the working volume within the fermenter was about 33.4 gallons. The pertinent data of this example are set forth in Table I.

EXAMPLES II-XIV

A series of fermentation runs were conducted using the same basic equipment, procedure, materials and conditions specified in Example I, except for certain variations as to the origin and solids content of the slop, the amounts and proportions of materials, and certain modifications in equipment.

The data in connection with these runs are set forth in Table I, being there designated by the example number II-XIV, giving in each case the particular modification in solids content, rate of feed of the slop-ammonia mixture, rate of aeration, total time of residence of the materials in the fermenter, the average pH at equilibrium, the yeast count at equilibrium, the amount of new protein produced, total air consumed, and percent of total $NH_3$ added.

The slops used in Examples II-VII were derived from a similar mash bill as that used in Example I. The slops used in Examples VIII-XI were prepared from evaporator syrup derived from slops of similar mash bill origin as the slops used in Example I. The slop used in Example XII was prepared from an evaporator syrup derived from a conventional degerminated corn bourbon mash bill, and the slop used in Examples XIII and XIV was obtained from an evaporator syrup derived from a conventional degerminated corn spirits mash bill.

Whenever the pH recorder indicated a drop of pH appreciably below 5, further amounts of aqueous ammonia were added to bring the pH to above 5. The ammonia was added either to the fermenter directly or passed into the pH cell line or was added to the slop-ammonia mixture feed line.

In Table I "G. P. H." designates rate of feed in gallons per hour, while "total air" designates total air consumption per weight of solids in the slop, based on the time of residence of the materials in the fermenter as established by the rate of feed of the slop-ammonia mixture. "Air rate" indicates the rate of aeration and is calculated in cu. ft. per minute of air per cu. ft. of liquid in the fermenter, while "total air" designates total air consumption and is expressed in terms of cu. ft. of air per pound of solids in the slop. "% $NH_3$" shows the amount of ammonia added in terms of $NH_3$, expressed as percent by weight of the solids in the slop.

In the examples and Table I, all data for yeast count, pH and new protein are averaged on the basis of 10 hour periods.

moval of coarse particles, having a temperature of about 200° F. After cooling to about 85° F., the slop was fed into the fermenter at the rate of about 5.7 gallons per hour. The fermenter contained a starting batch of yeasted slop material prepared as set forth in the preceding examples except that aqueous ammonia was automatically added during aeration by way of pH recorder connection with a solenoid valve in direct response to any pH drop to substantially maintain the pH constant at 5.5 throughout the batch operation which was continued until the yeast count was about 18 billion per gram solids. The fermenter (75 gallons) was set for a working volume of about 33.4 gallons.

Air was continuously introduced through a perforated coil aerator at the rate of 3.82 cu. ft. of air per minute per cu. ft. of liquid in the fermenter, being equivalent to a total of 495 cu. ft. of air per pound of solids in the slop calculated on a time of residence of the materials in the fermenter of 5.86 hours as determined by the rate of feed of the slop mixture of 5.7 gallons per hour. Whenever the pH as recorded by the pH cell fell below 5.5, the make and break contact of the pH recorder actuated the valve controlling the admission of ammonium hydroxide solution. Total consumed aqueous ammonium hydroxide solution was equivalent to 5.59% $NH_3$ by weight of solids in the slop. The average yeast count at equilibrium was about 15 billion per gram solids and the newly produced protein averaged at equilibrium 10% by weight of the solids.

The results of this example are also included in Table I.

Table I

| Ex. No. | Slop | | | Air Rate | Retention Time | pH at Equilibrium | Yeast Count, 10⁹/g. solids | New Protein in solids | Total Air | $NH_3$ |
|---|---|---|---|---|---|---|---|---|---|---|
| | Source | Solids | G. P. H. | | | | | | | |
| | | Per cent | | | Hours | | | Per cent | | Per cent |
| I | T. S. | 3.95 | 5.0 | 3.90 | 6.68 | 5.7 | 24 | 7.4 | 636 | 2.50 |
| II | T. S. | 3.93 | 8.7 | 3.77 | 3.84 | 5.1 | 12 | 4.8 | 358 | 2.56 |
| III | T. S. | 4.34 | 11.8 | 3.84 | 2.83 | 5.4 | 9 | 3.6 | 242 | 2.28 |
| IV | T. S. | 4.30 | 8.6 | 3.10 | 3.88 | 5.1 | 8 | 3.1 | 272 | 2.32 |
| V | T. S. | 4.41 | 6.0 | 3.48 | 5.56 | 5.1 | 17 | 4.9 | 435 | 2.32 |
| VI | T. S. | 4.32 | 3.8 | 3.82 | 8.80 | 6.7 | 22 | 8.3 | 762 | 3.65 |
| VII | T. S. | 4.41 | 5.8 | 3.82 | 5.76 | 4.1 | 11 | | 485 | None |
| VIII | E. S. | 4.34 | 8.3 | 3.64 | 4.19 | 5.3 | 18 | 6.6 | 351 | 2.44 |
| IX | E. S. | 4.30 | 5.6 | 1.12 | 6.22 | 4.8 | 8 | 3.1 | 158 | 2.56 |
| X | E. S. | 10.18 | 6.2 | 3.61 | 5.61 | 4.8 | 3.5 | 1.4 | 202 | 2.52 |
| XI | E. S. | 4.23 | 8.8 | 3.64 | 3.96 | 5.1 | 10.5 | 4.2 | 328 | 2.62 |
| XII | E. S. | 4.53 | 8.7 | 3.68 | 4.00 | 5.0 | 10 | 3.2 | 313 | 1.92 |
| XIII | E. S. | 3.67 | 10.5 | 3.66 | 3.31 | 5.3 | 7 | 4.3 | 332 | 2.04 |
| XIV | E. S. | 3.5 | 6.0 | 3.66 | 5.80 | 6.5 | 14 | 11.4 | 560 | 2.62 |
| XV | T. S. | 4.33 | 5.7 | 3.82 | 5.86 | 5.5 | 12 | 10 | 495 | 5.59 |

Notes: Fermenter working volume: Examples I-VII and XV=33.4 gal.; Examples VIII-XIV=34.8 gal.; Examples VIII, IX and X with carbon diffusers, all other with perforated coil aerator. Fermenter temperature: 83-87° F. T. S.=Thin slop. E. S.=Evaporator syrup.

EXAMPLE XV

A thin slop derived from a similar mash bill to that specified in connection with Examples I-VII, and having a solids content of about 4.33% by weight of the slop, was used. In this case the amount of ammonia added to the fermenter was coordinated with the pH within the fermenter to substantially maintain the same constant at about 5.5. This was accomplished utilizing an arrangement such as exemplified in Fig. 2, in which a make and break contact was arranged on the pH recorder at a point just below the 5.5 mark, and connected to a solenoid control. The valve was set to continuously supply a stream of 14% aqueous ammonium hydroxide solution. The slop was passed directly from the still through conventional screens for the re- The amount of ammonia to be added in each case depends largely upon the titratable acidity of the slop. When no automatic adjustment of ammonia during continuous fermenting operations is contemplated, sufficient ammonia should be initially used to bring the pH up to at least about 6. The pH frequently drops during yeasting, and, if the run is continued for a considerable length of time, additional amounts of ammonia may have to be added from time to time to bring the pH back within the effective range. In most cases, however, an amount of ammonia between 2 and 3% by weight of the solids in the slop will suffice for efficient operations without necessitating the addition of further amounts of ammonia at inconveniently frequent intervals.

The most convenient control is effectuated by correlating pH drop with an automatic influx of additional ammonia. Aside from the aspect of convenience, however, a continuously controlled pH within a relatively narrow range of constancy and a therewith coordinated continuous flow of ammonia exercises a synergistic effect with respect to newly produced protein, to bring about results beyond those that could be normally expected from either pH control or increased amounts of ammonia alone.

Yeast counts were made in accordance with conventional practice in the Levy counting chamber using dilutions of 1:1600 and compensating for differences in cell size by counting as one only those cells whose length is at least equal to the distance between double cross lines on the counting chamber (i. e., about 5 microns), counting as half all cells between approximately 5 and 2.5 microns, and not counting cells appearing less than 2.5 microns in length. The observed lengths of cells of the *Torulopsis utilis* var. *thermophila* range from less than 2.5 microns to over 15 microns, with the number of cells at either extreme being normally only a small fraction of the total.

Yeast counts were determined in terms of billions of cells per gram of solids in accordance with the following formula:

yeast crop (billions per gram solids) =

$$\frac{\text{yeast count (millions per milliliter)}}{\text{per cent solids in medium} \times 10}$$

Thus, if a count of 750 million per milliliter is obtained in a medium having 5% solids, the yeast crop in billions per gram of solids would be $$\frac{750}{5 \times 10} = 15$$

Yeast crops up to 8 billion per gram of solids may be considered low crop products; of 9 to 17 billion per gram of solids, as intermediate products; and of 18 to 24 billion per gram of solids, as high crop products.

The yeasted material continuously discharging from the fermenter may be immediately converted to a dry product or may be first stored and subsequently so converted. It is preferred, however, to pass the discharged yeasted product directly to appropriate evaporation and drying equipment in view of the saving involved in the fact that the discharged material is already at a somewhat elevated temperature. This is particularly true when the slop to be processed is a hot slop pumped directly from the still bottoms. The relatively high temperature of this slop can then be utilized, as exemplified in Fig. 2, to impart some of its heat to the yeasted overflow from the fermenter, thereby effecting a material saving in heat input that may be required in the concentration or evaporation step.

Conversion of the yeasted solubles to dry products as, for instance, for feed purposes, may be accomplished in the conventional manner which normally includes concentration by evaporation preferably in vacuum such as by way of a conventional forced circulation evaporator and the subsequent drying of the resultant syrup by suitable equipment such as conventional double drum rotary dryers under steam pressure. Evaporation is usually carried only to a solids concentration of about 30%, beyond which the viscosity of the syrup makes it difficult to handle. The double drum rotary dryers convert the material into dried sheets that are taken off by knives or the like, being thereafter flaked and ground.

In Table II, a typical analysis with respect to growth factors of various dried slop products treated in accordance with the invention is furnished, setting forth at the same time minimum values for growth factors established for chick feed requirements.

*Table II*

| Yeasted Material of Example | Solids, Per Cent | Yeast Count, billions per gram solids | Protein, Per Cent | Methionine, Per Cent | Lysine, Per Cent | Arginine, Per Cent | Histidine, Per Cent | Tryptophane, Per Cent | Leucine, Per Cent |
|---|---|---|---|---|---|---|---|---|---|
| I | 94.2 | 24 | 40.1 | 0.74 | 1.5 | 1.9 | 0.98 | 0.31 | 3.8 |
| II | 89.4 | 12 | 37.6 | 0.78 | 1.3 | 2.1 | 0.94 | 0.30 | 3.7 |
| III | 90.3 | 8 | 38.2 | 0.77 | 1.2 | 2.1 | 0.95 | 0.29 | 3.6 |
| IV | 88.9 | 8 | 38.5 | 0.79 | 1.2 | 2.4 | 0.90 | 0.32 | 3.9 |
| V | 93.1 | 17 | 39.3 | 0.80 | 1.3 | 2.3 | 0.99 | 0.32 | 4.3 |
| VI | 93.3 | 22 | 43.6 | 0.88 | 1.4 | 2.2 | 1.02 | 0.35 | 4.4 |
| VII | 93.1 | 11 | 31.5 | 0.69 | 1.1 | 1.7 | 0.63 | 0.24 | 3.2 |
| VIII | 89.5 | 18 | 40.9 | 0.84 | 1.3 | 2.0 | 0.92 | 0.27 | 4.2 |
| IX | 84.3 | 8 | 39.7 | 0.83 | 1.1 | 2.1 | 0.90 | 0.26 | 4.3 |
| X | 85.0 | 3.5 | 37.1 | 0.75 | 1.1 | 1.9 | 0.86 | 0.23 | 4.0 |
| XI | 89.7 | 10.5 | 36.0 | 0.70 | 1.1 | 1.8 | 0.90 | 0.23 | 3.8 |
| XII | 92.8 | 10 | 29.8 | 0.52 | 0.9 | 1.4 | 0.54 | 0.22 | 2.6 |
| XIII | 92.2 | 7 | 30.8 | | | | | | |
| XIV | 94.7 | 14 | 35.0 | | | | | | |
| XV | 90.7 | 12 | 37.7 | | | | | | |
| Chick Feed Requirements | | | | 0.74 0.5–1.0 | 1.3 0.9 | 2.0 0.9 | 0.84 0.15 | 0.28 0.2–0.5 | 3.9 1.0–2.0 |

| Yeasted Material of Example | Isoleucine, Per Cent | Valine, Per Cent | Phenylalanine, Per Cent | Threonine, Per Cent | Glutamic Acid, Per Cent | Choline, γ/gm. | Riboflavin, γ/gm. | Niacin, γ/gm. | Calcium Pantothenate, γ/gm. | Biotin, γ/gm. |
|---|---|---|---|---|---|---|---|---|---|---|
| I | 2.1 | 2.2 | 2.4 | 1.7 | 7.0 | 3,300 | 21.4 | 200 | 53 | 1.0 |
| II | 2.1 | 1.9 | 2.1 | 1.7 | 6.7 | 3,700 | 17.1 | 145 | 43 | 0.9 |
| III | 2.0 | 1.9 | 2.1 | 1.6 | 6.3 | 3,650 | 16.2 | 125 | 31 | 1.1 |
| IV | 2.0 | 2.0 | 2.2 | 1.6 | 7.1 | 4,000 | 18.2 | 135 | 35 | 1.2 |
| V | 2.0 | 2.0 | 2.2 | 1.5 | 6.6 | 3,550 | 20.9 | 150 | 56 | 1.3 |
| VI | 2.4 | 2.2 | 2.4 | 2.4 | 7.8 | 3,550 | 24.5 | 205 | 55 | 1.1 |
| VII | 1.8 | 1.5 | 1.8 | 1.5 | 5.6 | 3,100 | 18.7 | 135 | 15 | 1.1 |
| VIII | 2.2 | 2.1 | 2.0 | 1.6 | 6.9 | 2,700 | 19.4 | 135 | 31 | 1.5 |
| IX | 2.1 | 2.0 | 2.1 | 1.8 | 7.1 | 3,000 | 16.7 | 120 | 19 | 1.3 |
| X | 2.0 | 1.9 | 2.0 | 1.8 | 6.6 | 3,050 | 14.8 | 120 | 20 | 1.4 |
| XI | 1.9 | 1.9 | 1.8 | 1.4 | 6.3 | 3,050 | 19.4 | 110 | 28 | 1.4 |
| XII | 1.6 | 1.5 | 1.4 | 1.3 | 5.5 | 2,900 | 18.1 | 110 | 28 | 1.2 |
| XIII | | | | | | | | | | |
| XIV | | | | | | | | | | |
| XV | 2.0 | 1.9 | 2.1 | 2.1 | 6.2 | 3,150 | 17.6 | 155 | 24 | 1.2 |
| Chick Feed Requirements | 0.8–1.0 | 1.0 | 1.0 | 0.5–1.0 | | 150–250 | 3.0 | 18 | 7.5–15 | 0.15 |

All data in the foregoing Table II are calculated as percent by weight of total dried feed.

In chick test growth experiments conducted for the determination of the feed value and relative absence of deficiency in the slop products treated in accordance with the invention, significant differences in growth response were found. Thus, for instance, feeding with rations of yeasted slop materials prepared in accordance with the invention showed growth at 8 weeks more than 106% ahead of growth of a control group fed a ration of unyeasted slop from which the yeasted product was prepared.

Aside from the enhanced feed values of the products in accordance with the instant invention, another very important advantage is realized in the practice of the new method. This resides in the fact that the dried material yeasted in accordance with the invention is considerably less hygroscopic than the untreated slops and will substantially not cake. This is a factor of considerable importance to the feed trade. Furthermore, the evaporator syrup resulting from the product of the invention dries more readily than the same untreated evaporator syrup. The extensive difficulties involved in the drying of untreated slop evaporator syrups on the drying drums assert themselves primarily in that the material tends to roll off the knives of the dryer rather than form a sheet. These difficulties, however, are overcome by the practice of the invention in that the evaporator syrup of the product yeasted in accordance with the invention can be readily handled on the dryers, satisfactorily forming substantially non-hygroscopic non-caking substantially dry sheets that may be thereafter flaked and ground without necessity of further drying or other manipulation.

I claim:

1. Method for the substantially continuous treatment of distillers' slops containing not appreciably in excess of 10% of solid constituents normally present therein to enhance the feed value of said constituents which comprises substantially continuously aerating a batch of said slop, fermented aerobically with *Torulopsis utilis* in the presence of ammonia, continuously feeding into said batch such distillers' slop and ammonia, continuously removing fermented material from said batch, substantially maintaining the rate of feed of said slop and ammonia and the rate of removal of said fermented material at an average rate of residence of materials in said batch of from 2-10 hours with an ammonia concentration in excess of 1% by weight of solids of the in-feeding slop, and substantially maintaining within said batch a pH of from 4-8 and a temperature of from 75-115° F.

2. Method according to claim 1 in which said aerobic fermentation is carried out at a rate of aeration of from 1-8 volumes of air per minute per volume of liquid treated.

3. Method according to claim 1 in which the slop being continuously fed into said batch contains about 3-6% of said solids.

4. Method according to claim 3 in which said temperature is substantially maintained at from 80-95° F., and said pH at from 4.5-6.5, and in which the rate of feed of ammonia substantially adjusted to yield a continuing concentration within said batch of not exceeding that required to substantially maintain said pH range therein.

5. Method for the substantially continuous treatment of distillers' slops containing not appreciably in excess of 10% of solid constituents normally present therein to enhance the feed value of said constituents which comprises substantially continuously aerating a batch of said slop, fermented aerobically with *Torulopsis utilis* in the presence of ammonia, continuously feeding into said batch such distillers' slop and ammonia, continuously removing fermented material from said batch, substantially maintaining the rate of feed of said slop and ammonia and the rate of removal of said fermented material at an average rate of residence of materials in said batch of from 2-10 hours with an ammonia concentration in excess of 1% by weight of solids of the infeeding slop, and substantially maintaining within said batch a pH of from 5-6 and a temperature of from 75-115° F., and substantially maintaining the rate of feed of ammonia automatically responsive to a drop in pH below about 5 to thereby maintain said pH substantially constant within said range.

6. Method according to claim 5 in which the slop being continuously fed into said batch contains about 3-6% of said solids, and in which said temperature is substantially maintained at 80-95° F.

7. Method according to claim 6 in which said rate of feed and said rate of removal are coordinated to yield an average rate of residence of the materials in said batch of from 3-7 hours.

8. Method of the substantially continuous treatment of distillers slops containing from about 3% to 6% of solid constituents normally present therein to enhance the feed value of said constituents which comprises substantially continuously aerating a batch of said slop, fermented aerobically with *Torulopsis utilis* in the presence of ammonia, continuously feeding into said batch such distillers slop and ammonia, continuously removing fermented material from said batch, substantially maintaining the rate of feed of said slop and ammonia and the rate of removal of said fermented material at an average rate of residence of material in said batch of from 3 to 7 hours with an ammonia concentration in excess of 1% by weight of the solids of the infeeding slop, and substantially maintaining within said batch a pH of from 4.5-6.5 and a temperature of from 80° F. to 95° F., and substantially adjusting the rate of feed of ammonia to yield a continuing concentrating within said batch of not exceeding that required to substantially maintain said pH range therein.

9. Method according to claim 8 in which said slop and said ammonia are fed into said batch as a mixture containing about 1%-9% of ammonia by weight of the solids of the slop in said mixture.

10. Method for substantially continuous treatment of distillers slops containing from about 3% to 6% of the solid constituents normally present therein to enhance the feed value of said constituents which comprises substantially continuously aerating a batch of said slop, fermented aerobically with *Torulopsis utilis* in the presence of ammonia, continuously feeding into said batch such distillers slop and ammonia, continuously removing fermented material as overflow from said batch at a predetermined level, substantially maintaining the rate of feed of said slop and ammonia and the rate of removal of said fermented material at an average rate of residence of material of said batch of from 3 to 7 hours with an ammonia concentration from about 1% to 9% by weight of the solids of the infeeding slop, and substantially maintaining within said batch a pH of from 4.5–6.5 and a temperature of from 80° F. to 95° F., and substantially adjusting the rate of feed of ammonia to yield a continuing concentration within said batch of not exceeding that required to substantially maintain said pH range therein.

11. Method according to claim 10 in which said batch is aerated by forcing air into the same through a substantially solid porous carbon material.

12. Method according to claim 10 in which said batch is aerated by forcing air into the same through a substantially solid, substantially porous ceramic material.

13. Method for the substantially continuous treatment of distillers slop containing about 3% to 6% of solid constituents normally present therein to enhance the feed value of said constituents which comprises substantially continuously aerating a batch of said slop, fermented aerobically with *Torulopsis utilis* in the presence of ammonia, continuously feeding into said batch such distillers slop and ammonia as a mixture, continuously removing fermented material from said batch, substantially maintaining the rate of feed of said slop and ammonia and the rate of removal of said fermented material at an average rate of residence of material in said batch of from 3 to 7 hours with an ammonia concentration in excess of 1% by weight of the solids of the infeeding slop, and substantially maintaining within said batch a pH of from 5–6 and a temperature of from 80° F. to 95° F., and substantially maintaining the rate of feed of ammonia automatically responsive to a drop in pH below about 5 to thereby maintain said pH substantially constant within said range.

14. Method according to claim 13 in which said fermented material is substantially continuously removed as overflow from said batch at a predetermined level and in which said slop ammonia mix is continuously fed into said batch at a rate establishing by said overflow an average residence of said material in said batch of from 3 to 7 hours.

15. Method for the substantially continuous treatment of distillers slop containing about 3% to 6% of the solid constituents normally present therein to enhance the feed value of said constituent which comprises substantially continuously aerating a batch of said slop by forcing air through a substantially solid air diffusion material into said batch, fermented aerobically with *Torulopsis utilis* in the presence of ammonia, continuously feeding into said batch such distillers slop and ammonia as a mixture, continuously removing fermented material from said batch as overflow at a predetermined level, substantially maintaining the rate of feed of said slop and ammonia and the rate of removal of said fermented material at an average rate of residence of material in said batch of from 3 to 7 hours with an ammonia concentration in excess of 1% by weight of the solid of the infeeding slop, and substantially maintaining within said batch a pH of from 5–6 and a temperature of from 80° F. to 95° F., and substantially maintaining the rate of feed of ammonia automatically responsive to a drop in pH below about 5 to thereby maintain said pH substantially constant within said range.

16. Method according to claim 15 in which said air diffusion material is composed of substantially porous carbon material.

17. Method according to claim 15 in which said air diffusion material is composed of substantially porous ceramic material.

JACK G. VOSS.

REFERENCES CITED

The following references are of record in the file of this patent:

UNITED STATES PATENTS

| Number | Name | Date |
| --- | --- | --- |
| 2,447,814 | Novak | Aug. 24, 1948 |

OTHER REFERENCES

"Microorganisms and Fermentation" by Jorgensen, 1948, p. 320.

"Production of Food Yeast," The Chemical Age, Aug. 5, 1944, pp. 125–128.

"Vitamin-Rich Food" by Burton Food Industries, Nov. 1943, p. 66.

"Value of Micro-organisms in Nutrition," Nature, Apr. 10, 1943, pp. 406–409.

"How Sweden Produces Yeast" by Rosenquist—Food Industries, June 1944, pp. 443 and 444.